United States Patent [19]
Parfitt

[11] 3,782,511
[45] Jan. 1, 1974

[54] SELF-ADJUSTING BRAKES

[75] Inventor: Norman Leslie Cyril Parfitt, Ashby-de-la-Zouch, England

[73] Assignee: Coal Industry (Patents) Limited, London, England

[22] Filed: June 22, 1972

[21] Appl. No.: 265,326

[30] Foreign Application Priority Data
June 29, 1971 Great Britain.................... 30,390/71
Nov. 5, 1971 Great Britain.................... 51,591/71

[52] U.S. Cl................... 188/75, 188/56, 188/196 D
[51] Int. Cl............................................ F16d 49/20
[58] Field of Search....................... 188/56, 75, 170, 188/196 D

[56] References Cited
UNITED STATES PATENTS
3,599,761  8/1971  Schultz et al. ................. 188/196 D
3,298,473  1/1967  Jensen ............................ 188/75 X
2,822,064  2/1958  Weiland .............................. 188/75
3,100,032  8/1963  Larsson........................... 188/196 D

*Primary Examiner*—Duane A. Reger
*Attorney*—Richard K. Stevens et al.

[57] ABSTRACT

Each wheel of the vehicle is provided with a self-adjusting brake unit having two interconnected shoes which are spring-loaded into the applied position. Each brake unit has a hydraulic ram actuatable by pressure fluid to release the brake, means being provided for limiting the amount of shoe movement in the direction of brake release to a pre-selected amount. The shoes are interconnected by a threaded member along which one of the shoes is slidable and on which the said shoes is retained by nut which is urged along the threaded member to take up excess movement of the threaded member after movement of the shoes has reached the preselected amount.

4 Claims, 8 Drawing Figures

SELF-ADJUSTING BRAKES

This invention concerns improvements in or relating to self-adjusting brakes.

Such brakes are particularly useful for example when the brake is applied by a spring and is released by an opposing force as supplied by a fluid medium, for example hydraulic fluid or air. The self-adjusting feature enables the spring to work over a constant range of movement regardless of wear on the brake shoe or shoes and thus the spring can be of minimum size.

According to the present invention a self-adjusting brake for a vehicle, comprises at least one shoe, a piston and cylinder arrangement actuable by pressure fluid to release the brake against the action of resilient means tending to apply the brake, means for allowing movement of the shoe in the direction of brake application but restricting movement in the direction of brake release to a preselected amount, an operating device including a component connected to a part of the shoe and having a threaded portion, a member through one end of which the said threaded portion of the component slidably passes and a nut which is urged along the said threaded portion when the brakes are released and which when the brakes are applied contacts an abutment provided on the member to temporarily, fixedly retain the member in position with respect to the said threaded portion.

Advantageously, the nut is carried by a bearing.

Preferably the brake comprises two shoes interconnected by the operating device.

Preferably, the member is constituted by the cylinder of the piston and cylinder arrangement.

The nut may be urged along the said threaded portion by resilient means.

Advantageously, the nut may be urged along the said threaded portion by the pressure fluid acting on the piston and cylinder arrangement to release the brake.

Conveniently the said means may comprise a lost motion device.

By way of example only, three embodiments of the present invention will be described with reference to the accompanying drawings, in which.

Figure 1:
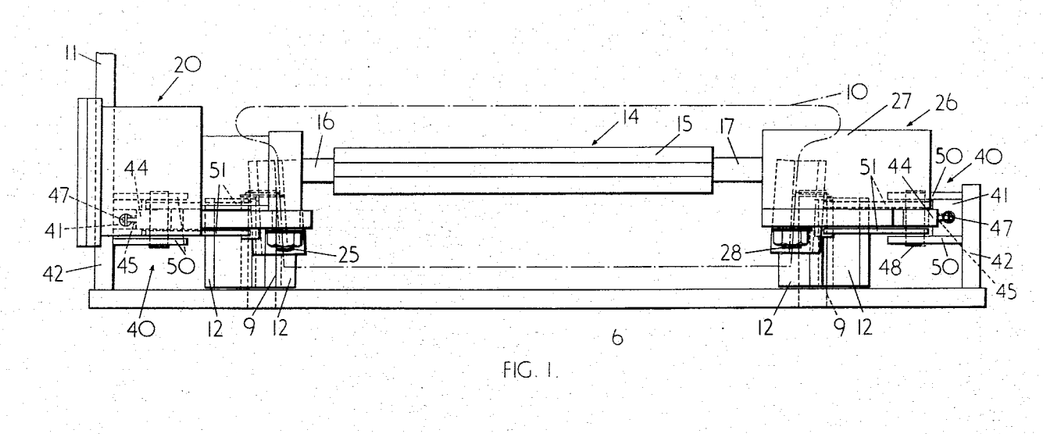
FIG. 1 is a plan of the first embodiment of a self-adjusting brake constructed in accordance with the present invention.
Figure 2:
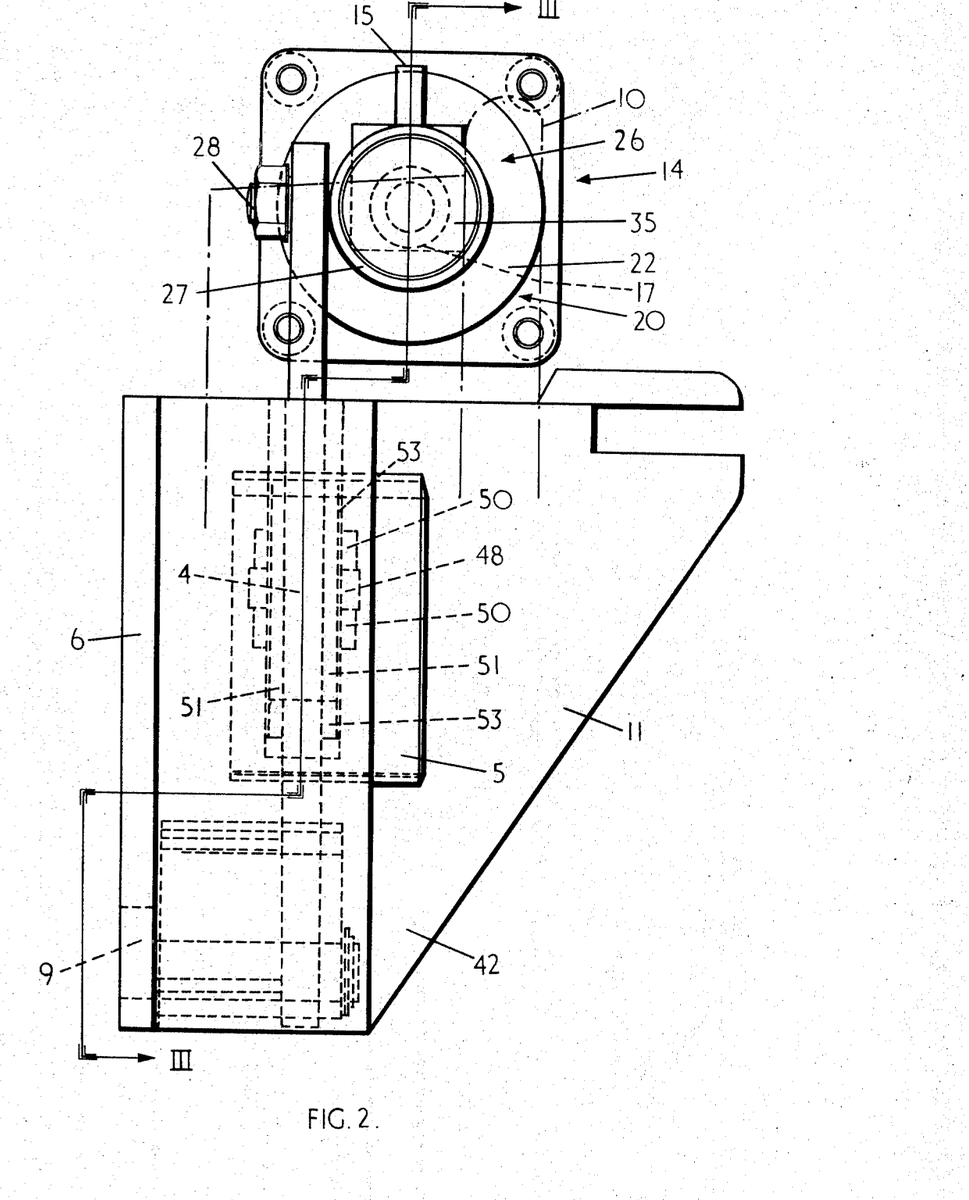
FIG. 2 is a side view of the brake of FIG. 1.
Figure 3:
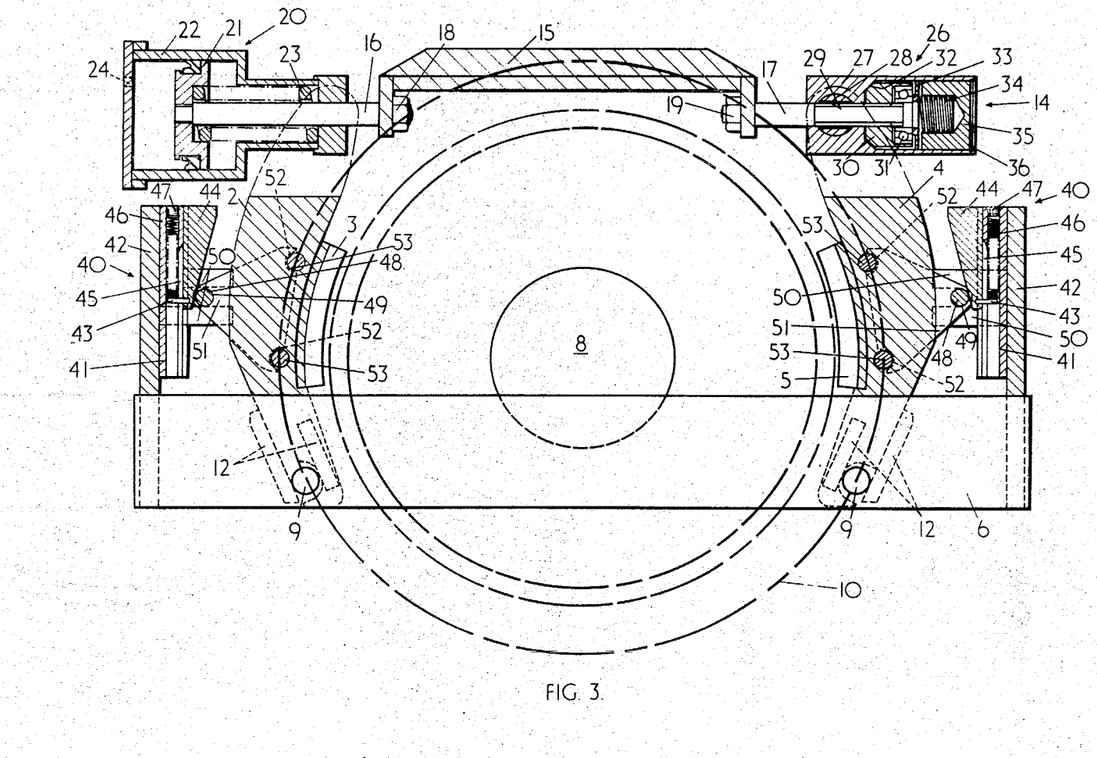
FIG. 3 is a sectional view along the line III—III of FIG. 2.

Referring now to FIGS. 1 to 3 of the drawings the first embodiment of the self-adjusting brake comprises two shoes 2, 4 having friction pads 3, 5 respectively, each of the shoes being pivotally mounted on a mounting plate. The mounting plate 6 is adapted by means (not shown) to be mounted on the end of an axle 8 of a wheel 10 (indicated in broken lines for the sake of clarity) of a rail-mounted vehicle (not shown). The mounting plate 6 is provided with a transversely extending fork-piece 11 (see FIGS. 1 and 2) which engages the vehicle chassis so as to prevent the mounting plate 6 rotating with the axle 8.

The mounting plate 6 is provided with two spigots 9 which are engaged by hook-shaped formations provided on the shoes 2, 4 respectively. Each of the shoes, 2, 4 has guide bars 12 which prevent the shoes 2, 4 twisting relative to the spigots 9.

The uppermost ends of the shoes 2, 4 are interconnected by means of an elongated component 14 comprising a central bracket 15 and two end rods 16, 17 secured by nuts 18, 19 to the end of the bracket.

The rod 16 constitutes the piston rod of a piston and cylinder arrangement 20 which has a piston 21 and a cylinder 22 and which is secured to the shoe 2 by a nut engaging a peg 25 (see FIG. 1). The piston 21 is urged into the cylinder 22 by a coil spring 23. The cylinder 22 has a feed port 24 for fluid medium e.g. compressed air or pressurised hydraulic liquid from a source which will be discussed later with reference to the operation of the brake.

The end of the rod 17 has a multi-start, coarse screw thread and is provided with means 26 for effectively reducing the length of the elongated component 14. The means 26 comprises a cylindrical body 27 having an axial bore engaging the rod 17 and a cross bore within which is fixedly engaged a peg 28. The peg 28 also has a cross bore 29 within which the rod 17 can freely slide and is pivotally engaged in a bore in the shoe 4 and is retained in position on the shoe 4 by a nut which abuts a shoulder formed on the peg. The axial bore is enlarged towards the end of the body 27 remote from the bracket 15 and accommodates a nut 30 which is engaged by a bearing 31 and which has a coned face 32 arranged to abut the base of the enlarged bore. The bearing 31 abuts a thrust washer 33 which is contacted by a coil spring 34 urging the washer 33, bearing 31 and nut 30 onto the rod 17. The spring 34 is accommodated within a recess formed in a cap 35 retained in the enlarged bore of the body 27 by a circlip 36.

The self-adjusting brake also comprises two devices 40 for allowing movement of the shoes 2, 4 respectively, in the direction of brake application but restricting movement in the direction of brake release to a relatively small amount.

Each of the devices 40 comprises a vertical slideway 41 secured to the mounting plate 6 via transverse plates 42 the end of one of which constitutes the forked-piece 11. The slideway 41 provides a track along which a wedge pin 43 projecting from a wedge 44 can slide, the wedge pin extends through a slot 45 formed in the side of the slideway 41 and (as shown in FIG. 3) extending over the lower portion of the slideway 41. The wedge pin 43 is urged downwards by a coil spring 46 retained in the slideway 41 by a plug 47 screwed into the end of the slideway 41.

The wedge 44 is prevented from moving downwards by its engagement with a pin 48 which has a resilient outer sleeve 49 and which is guided both horizontally and vertically by four guide members 50 secured to transverse plate 42.

The pin 48 of each of the devices 40 engages an arrangement comprising two generally triangular plates 51 having bores for engagement with the pin 48, and the bases of which have two circular grooves 52 which contact two thrust pins 53 extending from the associated shoe 2 or 4. The thrust pins 53 of each arrangement are located on opposite sides of a line drawn substantially normal to the surface of the wheel engaged by the shoe 2 or 4.

In operation, a train of vehicles each having a self-adjusting brake associated with each of its wheels, are coupled to a locomotive. The vehicles have supply pipes for feeding compressed air from a compressor on the locomotive along the train to each of the brakes.

When the locomotive is initially coupled to the train all the brakes are "applied" under the action of the springs 23 acting on the piston and ram arrangements 20. Each elongated component 14 urges the two shoes 2, 4 into the "applied" position, the body 27 being effectively held in position on the rod 17 by the coned face 32 of the nut 30 engaging the shoulder under the action of the spring 34. The shoes 2, 4 are pulled towards each other by the elongated component 14 and pivot about the spigots 9, the rod 17 being a loose fit within the cross bore 29 formed in the peg 28 so as to permit free pivoting of the shoes, 2, 4.

With the shoes 2, 4 in the "applied" position the wedges 44 of the device 40 are urged to move down the slideway 41 under the action of the springs 46 so as to remain in contact with the resilient outer sleeve 49 of the pin 48.

Upon the locomotive being coupled to the train of vehicles the brakes are released by feeding compressed air along the supply lines to the feed port 24 of the cylinders 22. The action of the compressed air in each of the cylinders 22 is to move the associated piston 21 against the action of the spring 23 and thus move the upper ends of the shoes 2, 4 apart and release the brakes.

The shoes 2, 4 of each brake move apart only a relatively small amount as determined by the thickness of the resilient outer sleeves 49. The pins 48 are prevented from moving beyond the relatively small amount by the wedges 44.

Upon the shoes 2, 4 moving the relatively small amount, the elongated component 14 may still move under the action of the compressed air in the cylinder 22, the rod 17 sliding witin the bore in the cylindrical body 27. As the rod 17 so slides it tends to move the nut 30, bearing 31 and thrust washer 33 against the action of the spring 34. However, immediately the coned surface 32 of the nut disengages the shoulder formed by the enlarged bore, the nut 30 is urged along the thread on the rod 17 so as to re-engage the shoulder. Thus the nut 30 is virtually always kept in engagement with the body 27 so that as soon as the compressed air is released from the cylinder 22 and the elongated component 14 moves under the action of the spring 23, the shoes 2, 4 are rapidly moved towards the "applied" position. The means 26 thus take up excess movement of the elongated component 14 in the direction of brake release, this excess movement arising because of wear of brake pads 3, 5 upon repeated use.

Upon the brakes being re-applied, the supply of compressed air is removed from the cylinders 22 which allows each of the elongated components 14 to move the shoes 2, 4 towards each other. As soon as the pads 3, 5 contact the wheel surface they tend to move in the direction of the wheel, i.e. if the wheel 10 in FIG. 3 is rotating in a clock-wise direction the pad 3 would tend to move upwards on contacting the wheel surface and the pad 5 would tend to move downwards on contacting the wheel surface. When the pads 3, 5 so move, they cause the triangular plates 51 of the arrangements to pivot about the associated pivot pins 48. The plates 51 tend to move in the same directions as the pads 3, 5. The triangular plates 51 associated with the pad 3 act on the lower of the two thrust pins 53 tending to urge the pin towards the wheel and towards the line normal to the wheel surface and passing through pivot pins 48. As the pins 48 and 53 are spaced apart by a distance greater than the perpendicular distance between the pivot pin and the wheel surface the action of the arrangement comprising the triangular plates 51 is to make the brake self-energising i.e. to make use of the kinetic energy of the rotating wheel and moving vehicle to apply the brakes.

Thus with this embodiment of brake, the action of the spring 23 is not the only force providing the braking thrust and therefore a relatively weak spring 23 can be used with this brake.

Since a relatively weak spring is used with this embodiment and since the piston and ram arrangement is sealed the quantity of compressed air required to release the brake is appropriately low. Thus less compressed air needs to be supplied to the train of vehicles so that relatively small diameter feed pipes are required.

Upon the brakes being released the shoes 2, 4 move the triangular plates 51 back into their original positions with both the thrust pins 53 of both shoes 2, 4 located in the curved grooves 52.

When the wheel 10 rotates in counter-clockwise direction as seen in FIG. 3 and the brakes are applied, the triangular plates 51 are moved in the opposite direction by the pads 3, 5 and the brake thrust is transmitted via the other thrust pins 53 i.e. the uppermost pin associated with the shoe 2 and the lowermost pin associated with the shoe 4.

When the brake is in the applied position the triangular plates 51 no longer engage those of the thrust pins 53 which are not transmitting the brake thrust.

In modified forms of this embodiment of brake the cone surfaces of the nut 30 and of the body 27 are dispensed with.

From the above description it can be seen that this embodiment of the present invention provides a self-adjusting brake which is simple and has a rapid response and which is partially self-energizing.

Figure 4:
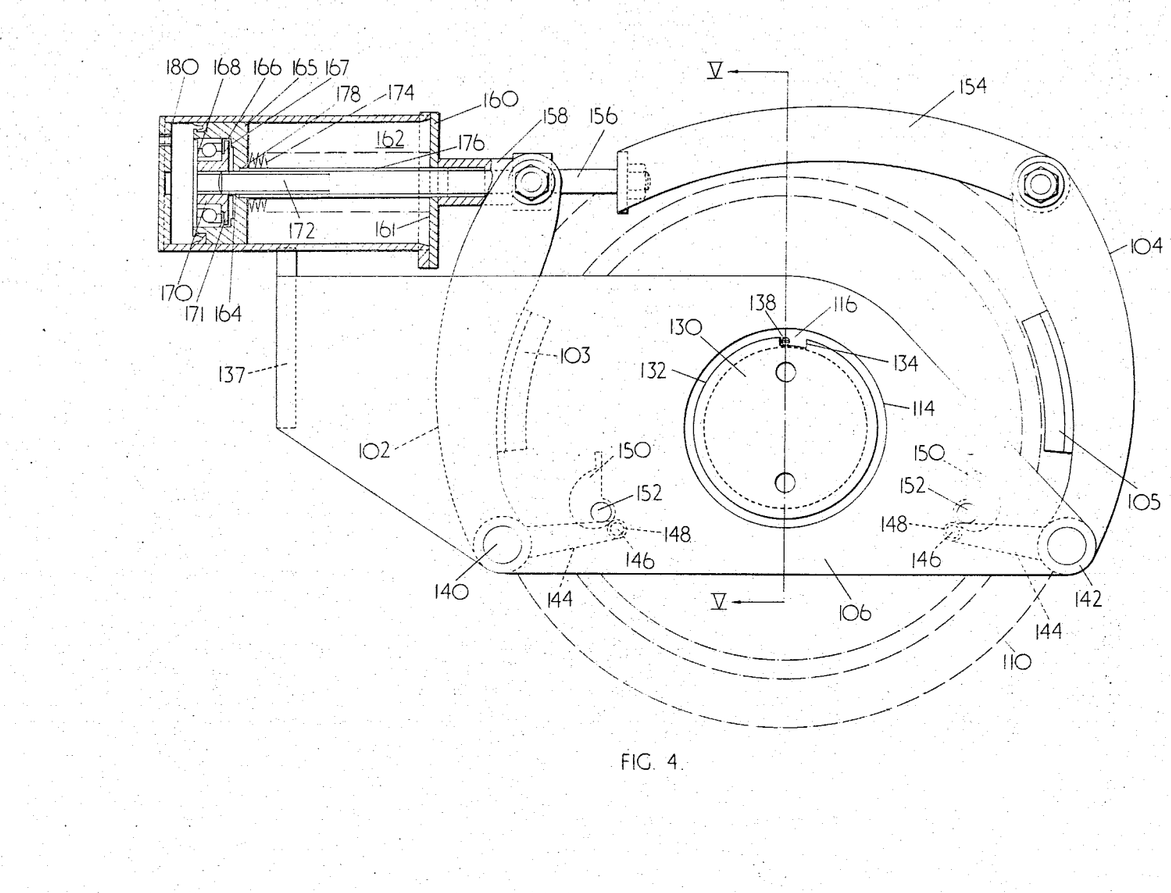
FIG. 4 is a side view, partly in section of the second embodiment of self-adjusting brake constructed in accordance with the present invention.
Figure 5:
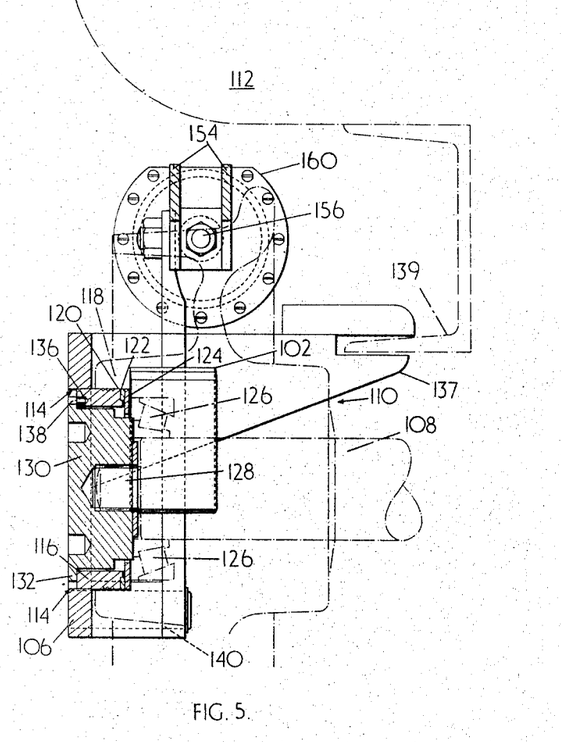
FIG. 5 is a sectional view on the line V—V of FIG. 4.
Figure 6:
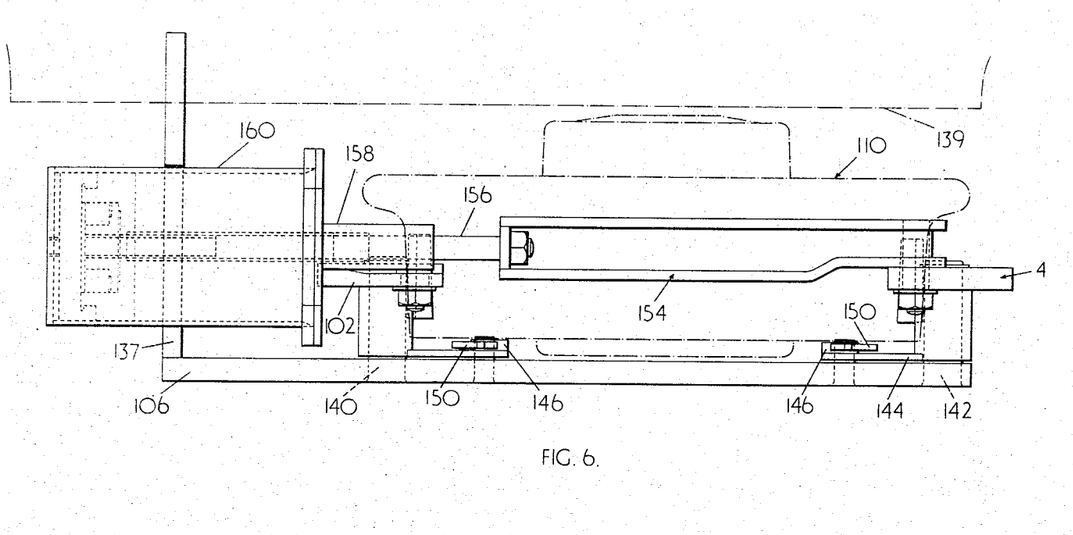
FIG. 6 is a plan of FIG. 4.

Referring to FIGS. 4, 5 and 6 of the drawings, which show the second embodiment of a self-adjusting brake includes two shoes, 102, 104 having friction pads 103 and 105, respectively, each of the shoes being pivotally mounted on a mounting plate 106. The brake is shown mounted on axle 108 of a wheel 110 of a vehicle 112, for example, a mine car (only a part of which is shown). The plate 106 has a bore 114 within which is secured, by welding, a collar 116; the collar 116 extends rearwardly a short distance from the back of plate 106 and is of such outer diametral dimension as to fit within hub 118 of wheel 110. The hub 118 is provided with a shouldered recess 120 to receive the collar 116 and, in position within the recess 120, seals 122 are located intermediate the inner end of collar 116 and shoulder 124 of the recess 120. The seals are provided to seal bearing 126 from the ingress of extraneous matter; the bearing 126 is of the taper roller type with its outer race carried by hub 118 and its inner race carried by the axle 108. The axle 108 carries a threaded portion 128 which extends into the recess 120, to be engaged by an internally threaded end cap 130 which has a flange 132. In order to secure the plate 106 to the hub 118 the cap 130 is threaded onto portion 128 of axle 108, the flange 132 of the cap abutting the collar 116 of plate 106 so as to hold the collar within recess 120. The flange 132 of cap 130 is relieved at 134 and the collar 116 is provided with a threaded hole 136 for the engagement therein of a set screw 138, the screw 138 locating the cap 130 relative to the collar 116.

The plate 106 is provided with a rearward extension 137 which is formed so as to engage a structure 139 of the vehicle 112 such that in use upon brake application the brake is prevented from rotating with the wheel 110.

The shoes 102, 104 as aforesaid are pivotally mounted on the plate 106 at 140, 142, respectively, each shoe carrying a lever 144 having a pin 146 located at its free end. Each pin is provided with a sleeve 148 of resilient material which is adapted for abutment with a cam 150 pivotally mounted at 152 on the rear face of plate 106. The levers 144, pins 146 and cams 150 constitute means for allowing movement of the shoes in the direction of brake application and restricting movement in the direction of brake release to a small amount, the operation of these means being described hereinafter.

The shoe 104 is pivotally connected at its end remote from pivot mounting 142 to an actuating lever 154 which is attached at its other end to an elongate member in the form of a rod 156. The shoe 102 is attached at its end remote from pivotal mounting 140 to a tubular guide 158 located at one end 161 of a cylinder 160. The rod 156 passes slidably through guide 158 to enter cavity 162 of cylinder 160 and extends through a central bore 164 of a piston 165 which is movable within the cylinder cavity 162. The piston is provided with a cylindrical recess 166 in one end thereof remote from the end 161 of the cylinder 160. The recess 166 communicates with the bore 164 and has an abutment shoulder 167 circumjacent the bore; the recess has freely slidably mounted within and at or towards its open end the outer race of a ball bearing 168. The inner race of the bearing 168 is mounted on engagement means in the form of a nut 170 having a flange 171; the nut 170 has an internal thread engageable with an externally threaded portion 172 of the rod 156, the pitch angle of the threads being greater than the friction angle.

The bearing 168 and nut 170 are retained in the recess 166 by a circlip (not shown), the assembly being such that when the bearing is in contact with the circlip a small clearance exists between the flanges 171 of the nut 170 and the abutment shoulder 167, thus clearance is, for example, of the order of 0.005 inches.

Intermediate and extending between the piston 166 and the said one end of the cylinder 160 is a group of operating springs 174 which in this instance are of the type known as Bellville washers. The springs 174 are located circumjacent a locating tube 176 which is slidable relative to the rod 156, one end of the tube 176 extending into and immovably fixed in a recess 178 of the piston 165 adjacent bore 164 and the other end extending partially and slidably into the tubular guide 158.

The end of the cylinder remote from the guide 158 is provided with a port 180 for the entry and exhaust of a fluid medium for example, air, the brake being one in which fluid is introduced into the cylinder 160 to release the brake.

The operation of the self-adjusting brake is as follows:

When it is desired to apply the brake to the wheel 110 and thus bring the friction pads 103 and 105 into frictional contact with hub 118 of wheel 110, fluid pressure on the free side of piston 165 is released through port 180 in cylinder 160. The opposing force of the springs 174 on piston 165 causes the piston 165 to move towards the left-hand side of the cylinder 160. As a result of this piston movement and since resistance to sliding movement of the outer rail of the bearing 168 along the recess 166 is less than the resistance to movement of the nut 170 along the threaded portion 172, the abutment shoulder 167 moves to abut flange 171 of nut 170 which in turn is engaged internally thereof with threaded portion 172 of rod 156. This abutment of shoulder 167 and flange 171 prevents the nut 170 from rotating along the portion 172 and thus causes rod 156 to move relatively to cylinder 160. The reaction of the springs 174 on the end 161 of cylinder 160 likewise causes the cylinder 160 to move in the opposite direction thus resulting in the shoe 102 moving towards hub 118 and the shoe 104 actuated by rod 156 through lever 154 moving towards the hub. During the brake application the shoe 102 moves in a clockwise direction about mounting 140 and the shoe 104 moves in an anti-clockwise direction about mounting 142, each shoe carrying its lever 144 with it. Consequent upon such directional movement each cam 150 will rotate about its pivot 152 in a direction opposite to that in which its associated shoe moves either under spring action or gravity such that contact between the peripheral edge of the cam and the resilient sleeve 148 is maintained.

When it is desired to release the brake air is applied to the free side of piston 165 via port 180 so as to move piston 165 in cavity 162 of cylinder 160. The application of air in this manner causes the friction brake pads 103 and 105 to move out of frictional contact with wheel 110. The extent to which the pads 103 and 109 move away from the hub 118 is limited by the position of cams 150 and the movement of levers 144, the cams restricting the extent of release movement independent of the wear on pads 103 and 105. The resilient material of sleeves 148 deflects sufficiently in abutting the cams 150 to give a preselected clearance between pads 103, 105 and wheel rim 110, this clearance is maintained during the period of brake release by fluid pressure on the end of rod 156.

It will be appreciated that consequent upon the wear on pads 103 and 105 and the restriction on movement of the shoes 102, 104 in the direction of brake release, the shoes 102, 104 move progressively nearer to the wheel 110. Thus it can be seen that this progressive movement results in the rod 156 extending further into the cylinder cavity 162 immediately after each brake application. Since it is intended that the springs 174 should operate over a constant range it is essential that the piston 165, upon brake release, be returned to an operating position in which this constant range operation can be achieved.

Thus if the initial movement of piston 165 is insufficient to compress the springs 174 to the operating position, the piston 165 continues to move together with locating tube 176 which is abutted by the shoulder of recess 178. This continued movement causes the threaded portion 172 of rod 156 to be forced into the nut which thereby is moved out of contact with the shoulder 167 and is free to rotate along the threaded portion 172 thus allowing the piston 165 and springs 174 to assume their operating position. Shoes 102 and 104 are held in the release position by fluid pressure on the end of the rod 156.

Although no seals are provided between the bearing 168, nut 170 and the sides of the recess 166 by maintaining a small machining clearance between the bore of the tube 176 and the rod 156 the leakage of air is kept to an acceptable amount.

Figure 7:
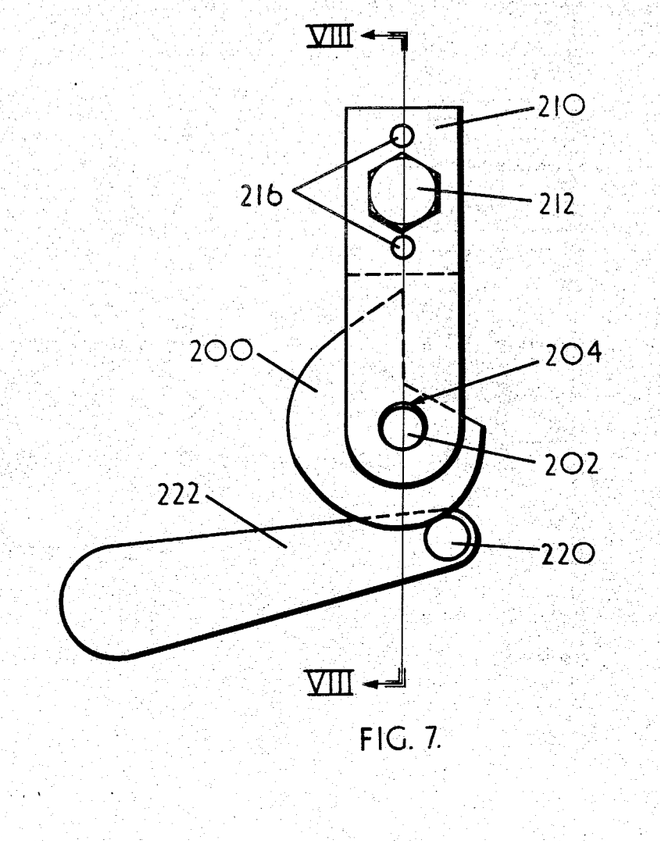
FIG. 7 is a side view of a detail of the third embodiment of self-adjusting brake.
Figure 8:
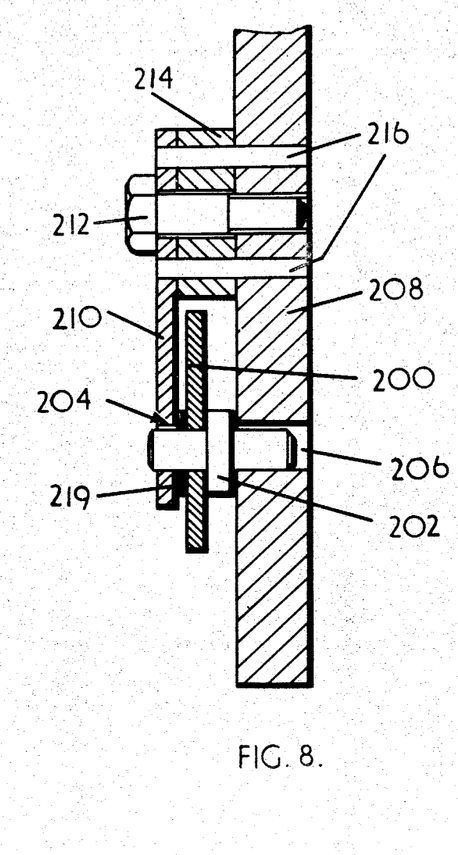
FIG. 8 is a section along the line VIII—VIII of FIG. 7.

Referring now to FIGS. 7 and 8 which show the means of a third embodiment of brake for limiting the amount of movement of a brake shoe in the brake release direction.

The means comprise a cam 200 mounted on a spindle 202 located in bores 204 and 206 formed in a plate 208 fixedly mounted on the vehicle chassis (not shown) and a support bracket 210 bolted by a bolt 212 to the plate 208, respectively. The support bracket 210 is space from the plate 208 by a packing piece 214 and located by two coil pins 216.

The portions of the spindle 202 which are engaged in the bores 204, 206 are of less diameter than the bores so that the spindle can move freely upwards over a relatively small limited distance e.g. the diameter of the said portions of the spindle may be 0.025 inches less than the diameter of the bores.

A washer 219 is provided to space the cam 200 from the support bracket 210.

The cam 200 is contacted by a pin 220 (not shown on FIG. 8) fixedly located on a lever 222 which is rigidly secured to the associated brake shoe (not shown).

In operation when the brakes are applied the shoe moves so that the lever 222 (as seen in FIG. 7) moves downwards. As soon as the pin 220 disengages the cam 200, the cam 200 which is suitably biased rotates until it once again engages the pin 220.

When the brakes are released the shoe moves so that the lever 222 (as seen in FIG. 7) is raised. Since the pin 220 is in contact with the cam 200 the upward movement of the lever 220 is restricted to the amount of clearance of the spindle 202 in its location bores 204, 206, the lever 222, pin 220, cam 200 and spindle 202 being raised only until the spindle abuts the upper surfaces of the bores.

Thus the movement of the shoe in the brake "release" direction is limited to a pre-selected amount.

Upon the brakes being re-applied, the lever 222 moves downwards (as seen in FIG. 7) allowing the cam 200 and spindle 202 to fall until the spindle contacts the lowermost surfaces of the bores 204, 206. Any further downward movement of the lever 222, caused by wear of the brake pad, is accommodated by rotation of the cam 200 as previously described.

This third embodiment of brake limits the amount of movement of the brake shoes in the brake "release" direction and dispenses with the need for resilient sleeves which in some installations may tend to wear quickly.

I claim:

1. A self-adjusting brake for a vehicle wheel, comprising at least one shoe assembly movably mounted with respect to the vehicle chassis, movement restricting means coupled with the shoe assembly for allowing movement of th shoe assembly in the direction of brake application but restricting movement of the shoe assembly in the direction of brake release to a preselected amount, resilient means tending to urge the shoe assembly to apply the brake to said wheel, and an operating mechanism coupled to the shoe assembly and comprising a piston and cylinder arrangement and a connector device, the piston and cylinder arrangement being actuated by fluid pressure to move the shoe assembly to release the brake against the force exerted by said resilient means, the connector device and said movement restricting means cooperating to ensure that a preselected braking force is exerted by the resilient means, the connector device having two components which are movable with respect to each other and which are connected to said shoe assembly and to the piston and cylinder arrangement, respectively, one of the said components having a threaded portion, and a nut which is urged along said threaded portion when the brake is released and which, when the brake is applied, contacts an abutment provided on the other of said components to fixedly, temporarily retain the other component in position with respect to said threaded portion.

2. A self-adjusting brake for a vehicle wheel, comprising two shoe assemblies pivotally mounted with respect to the vehicle chassis, restricting means coupled with each of the shoe assemblies for allowing pivotal movement of the shoe assemblies in the direction of brake application but restricting pivotal movement of the shoe assemblies in the direction of brake release to a preselected amount, resilient means urging said shoe assemblies in the direction of application, and an operating mechanism interconnecting the two shoe assemblies and comprising a piston and cylinder arrangement and a connector device, the piston and cylinder arrangement being actuated by pressure fluid to pivot the shoe assemblies to release the brake against the force exerted by said resilient means tending to pivot the shoe assemblies to apply the brake, the connector device and said restricting means cooperating to ensure that a preselected braking force is exerted by the resilient means, the connector device having two components which are movable with respect to each other and which are connected to a part of one of the shoe assemblies and to the piston and cylinder arrangement, respectively, one of the components having a threaded portion, and a nut which is urged along the threaded portion when the brake is released and which, when the brake is applied, contacts an abutment provided on the other component to fixedly, temporarily retain the other component in position with respect to the threaded portion.

3. A brake as claimed in claim 2, in which the nut is urged along the threaded portion by resilient means.

4. A brake as claimed in claim 2, in which the nut is urged along the threaded portion by the fluid pressure acting on the piston and cylinder arrangement to release the brake.

* * * * *